United States Patent [19]

Heeks

[11] Patent Number: 4,620,193

[45] Date of Patent: Oct. 28, 1986

[54] OPTICAL PHASE ARRAY RADAR

[75] Inventor: John S. Heeks, Old Harlow, England

[73] Assignee: International Standard Electric Corporation, New York, N.Y.

[21] Appl. No.: 619,653

[22] Filed: Jun. 11, 1984

[30] Foreign Application Priority Data

Jun. 16, 1983 [GB] United Kingdom ................. 8316414

[51] Int. Cl.[4] ............................................. G01S 13/00

[52] U.S. Cl. ..................................... 342/200; 342/368

[58] Field of Search ..................... 343/368, 374, 9 PS, 343/16 R

[56] References Cited

U.S. PATENT DOCUMENTS

| | | | |
|---|---|---|---|
| 3,878,520 | 4/1975 | Wright et al. | 343/368 |
| 4,028,702 | 6/1977 | Levine | 343/374 |
| 4,258,363 | 3/1981 | Bodmer et al. | 343/16 R |

OTHER PUBLICATIONS

Levine: "Use of Fiber Optic Frequency and Phase Determining Elements in Radar", 6/1/79, pp. 436–443, Conference Proc. of 33rd Symposium on Frequency Control.

Dillard: "Radar Signal Processing Using Fiber and Integrated Optics", 10/28/77, Conference: Radar, 1977, pp. 363–367.

*Primary Examiner*—Theodore M. Blum
*Assistant Examiner*—David Cain
*Attorney, Agent, or Firm*—T. L. Peterson; J. S. Christopher

[57] ABSTRACT

In an optically controlled phased array radar control information in the form of microwave frequency modulation of an optical carrier is transmitted by optical waveguide from a central processor to each of the antenna elements. Phase shifts introduced by each of the individual waveguides are then monitored to provide a compensation signal used either to regulate the phase shift or to offset the phase of the modulation applied to the waveguide at the central processor end.

10 Claims, 6 Drawing Figures

OPTICAL PHASE ARRAY RADAR

BACKGROUND OF THE INVENTION

This invention relates to phased array radars and is particularly concerned with how to drive the individual antenna elements of such an array from a central processor.

PRIOR ART STATEMENT

Electro-optical apparatus for phased arrays are known in the prior art. For example, see Wright et al. U.S. Pat. No. 3,878,520 issued Apr. 15, 1975, and Levine U.S. Pat. No. 4,028,702 issued June 7, 1977. Both of these prior art patents require switching between optical fibers.

Though the concept of phased array radar would provide significant operation advantages, particularly in the military scenario, the development of such systems has been held back by the per element phase control problem. In detail the system considerations can be different for transmitting or receiving arrays and are dependent upon the technical approach taken. Basically, in transmission it is necessary to pass to the antenna elements from a central processor:

(I) instantaneous microwave frequency
(II) microwave phase
(III) pulse edge timing.

Differential phase between the elements establishes the beam direction and the pulse edge timing is tailored to maintain a constant pulse sidelobe level in the time domain for different beam direction.

On receive, control to the phased array radar elements again involves microwave frequency and phase for the local oscillator, but in addition the target information is required to be collected from each element.

Hitherto, in the standard approach to both receiver and transmitter phased array radar systems, a signal at the transmit frequency or LO, or at a subharmonic of these frequencies, is fed to the elements via a radio frequency (RF) manifold, usually a coaxial line, microstrip or waveguide. In the transmit mode a phase shifter is incorporated in each element to set the output phase of the element. A greater variety of techniques can be used in a receive array by providing the phase shifting at RF, intermediate frequency (IF), or baseband.

SUMMARY OF THE INVENTION

The present invention is however concerned with phased array radar systems in which the control information is transmitted to each of the antenna elements by microwave frequency modulation of an optical carrier. The RF manifold may then be replaced by a bundle of single mode optical fibers thereby affording the possibility of much greater compactness.

It will be appreciated that, unless the individual optical fibers by which the individual antenna elements are connected to the central processor all have the same length, the relative phases of any microwave modulation impressed on the optical signals at the central processor end will not in general be the same as the relative phases appearing at the individual antenna elements. It is in principle possible to arrange for the fibers to be accurately cut to the same effective optical length and to be fabricated with low temperature material so that temperature variations have no significant effect upon that length. However, such an approach is critical and uncertain. The present invention is particularly concerned with an alternative approach in which changes in path length are monitored and appropriate measures taken.

According to the present invention there is provided an optically controlled phased array radar, wherein the operation of the antenna elements of the radar is controlled from a central processor by microwave frequency signals impressed on optical carriers relayed from the central processor to the individual antenna elements on individual optical waveguide transmission links. Each link includes means for monitoring the microwave frequency phase shift introduced by that link to provide a compensation signal which is used either to regulate the optical path length of that link or to offset the phase of the microwave frequency modulation of an optical signal applied to that link by the central processor.

A preferred way of monitoring the phase shift is to insert a four-port directional coupler into the link at the central processor end and to use photodetectors connected to two of the ports to detect respectively a portion of the launched light and a portion of the light returning after reflection at the antenna end. The detector outputs are mixed to give a signal representative of the phase shift, at the microwave modulation frequency, introduced by the round trip path.

BRIEF DESCRIPTION OF THE DRAWINGS

In the accompanying drawings which illustrate exemplary embodiments of the present invention.

DESCRIPTION OF THE PREFERRED EMBODIMENTS

Figure 1:
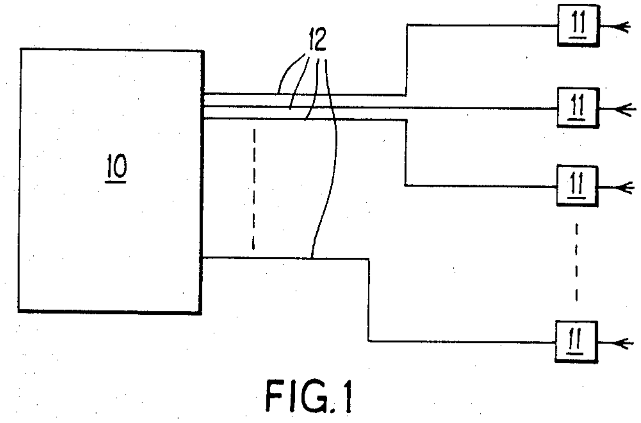
FIG. 1 is a block diagram of a radar system constructed in accordance with the present invention.

FIG. 1 is a block diagram of an optically controlled phased array radar. It shows a central processor 10 connected with the individual members of an array of antenna elements 11 by way of individual optical transmission links 12. In the central processor microwave modulation has to be applied to an optical carrier, which is conveniently the output of an injection laser diode.

There are three contending techniques for applying a high frequency modulation to a laser diode source. A separate modulator at the laser output, or square wave current modulation of the laser may be used in conjunction with one modulation bit delay in a series Mach-Zehnder interferometer. Alternatively two lasers may be operated in a phase locked loop configuration at the offset frequency of the required modulation. The last method has the advantage that it is applicable to millimeter wave frequencies just as easily as it is to low microwave frequencies. This contrasts with separate modulators which currently are only realizable at the lower microwave band. However, the phase locked loop approach involves the penalty that phase control is rather less conveniently implemented because a phase reference at the microwave frequency has to be provided, rather than the phase being set directly by adjusting the relative optical phase via an analog input to a phase control.

Figure 2:
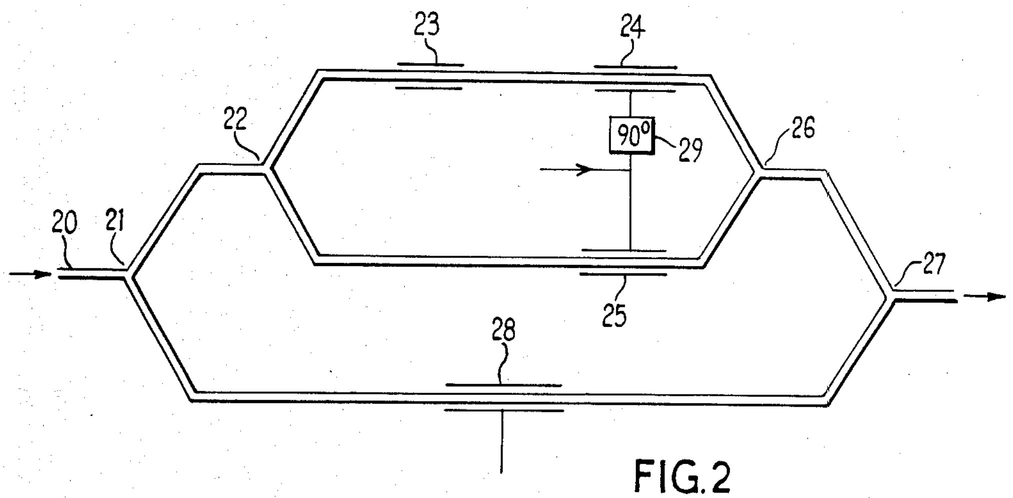
FIGS. 2 and 3 are diagrammatic views of alternative embodiments of the invention for the central processor of the system.

FIG. 2 illustrates an implementation of the direct modulation approach. At the input end light, propagating in a lithium niobate integrated optics waveguide 20 is launched into a two-way splitter 21, one of whose branches feeds a second two-way splitter 22. One branch of this second splitter passes through phase retarding elements 23 and 24, while the other branch passes through a phase retarding element 25, and then the two branches are combined in a recombiner 26. The output of this recombiner feeds one input branch of a second recombiner 27 whose other branch is fed by the other output of the first two-way splitter 21 having first passed through a phase retarding element 28. Phase retarding elements 24 and 25 are driven from a microwave source (not shown in FIG. 2) with a 90° microwave phase shifter 29 in one of the drive paths so that the drives are in phase quadrature. This makes that part of the circuitry from the two-way splitter 22 to the recombiner 26 a straight optical analog of a conventional single-side-band modulator, with the phase retardation of element 23 being set to a fixed value that compensates for any optical phase mismatch at recombiner 26 attributed to differences in optical path length in the two branches in the absence of any modulation applied to elements 24 and 25. The phase of the microwave modulation on the optical carrier emerging from recombiner 27 is controlled by the optical phase retardation introduced by phase retarding element 28, with an *optical* frequency phase change of x° at element 28 producing an equivalent phase change of x° in the *microwave* frequency modulation of the output from recombiner 27.

Figure 3:
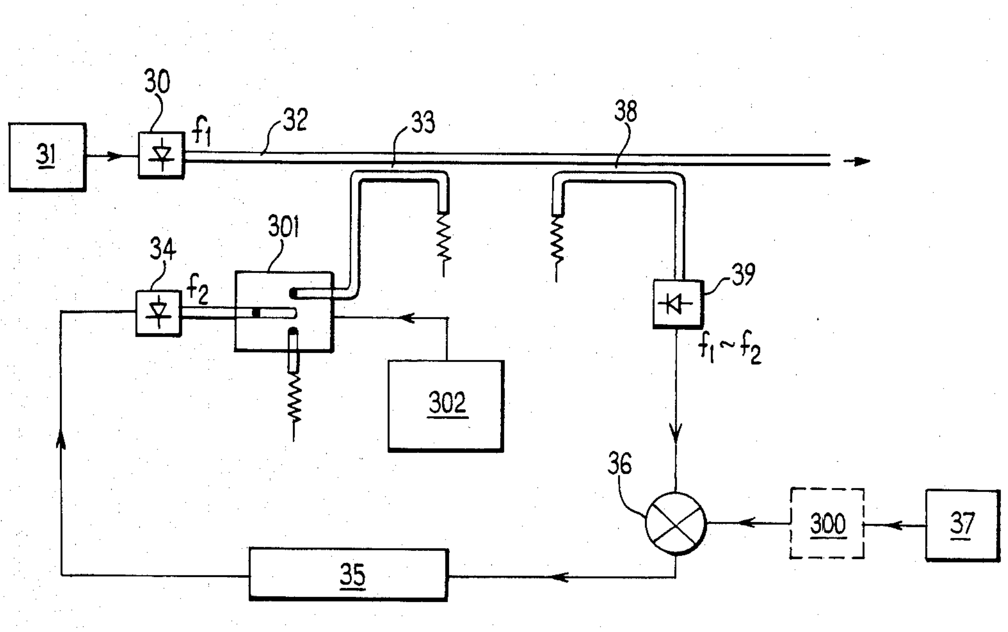

FIG. 3 illustrates an implementation of the alternative phase locked loop controlled microwave modulation system. An injection laser 30 is driven by frequency stabilization control circuitry 31 to provide a frequency stabilized optical output at a frequency $f_1$, which is launched into an optical waveguide 32. This light is heterodyned in a directional coupler 33 with light from a second injection laser 34 operating at a frequency $f_2$. The difference frequency $(f_1-f_2)$ is the frequency of the required microwave modulation to be impressed on the optical carrier. For this purpose the second laser 34 is driven by frequency control circuitry 35 which derives its control signal from a phase sensitive detector 36 fed with a first signal from a microwave frequency local oscillator 37 operating at the desired modulation frequency and a second microwave frequency signal derived by detecting a portion of the modulated optical carrier. For this purpose a second directional coupler 38 is used to tap off a small proportion of the optical power. This is fed to a detector 39 whose output is fed to the phase sensitive detector 36. Normally the same local oscillator 37 will be used for driving each modulator of the array, and hence a microwave frequency phase shifter 300 may be included between the local oscillator 37 and the phase sensitive detector 36 to control the phase of the microwave modulation of the optical carrier. FIG. 3 also shows an optical switch 301 controlled by a pulse timer 302 for switching the modulation on and off.

Figure 4:
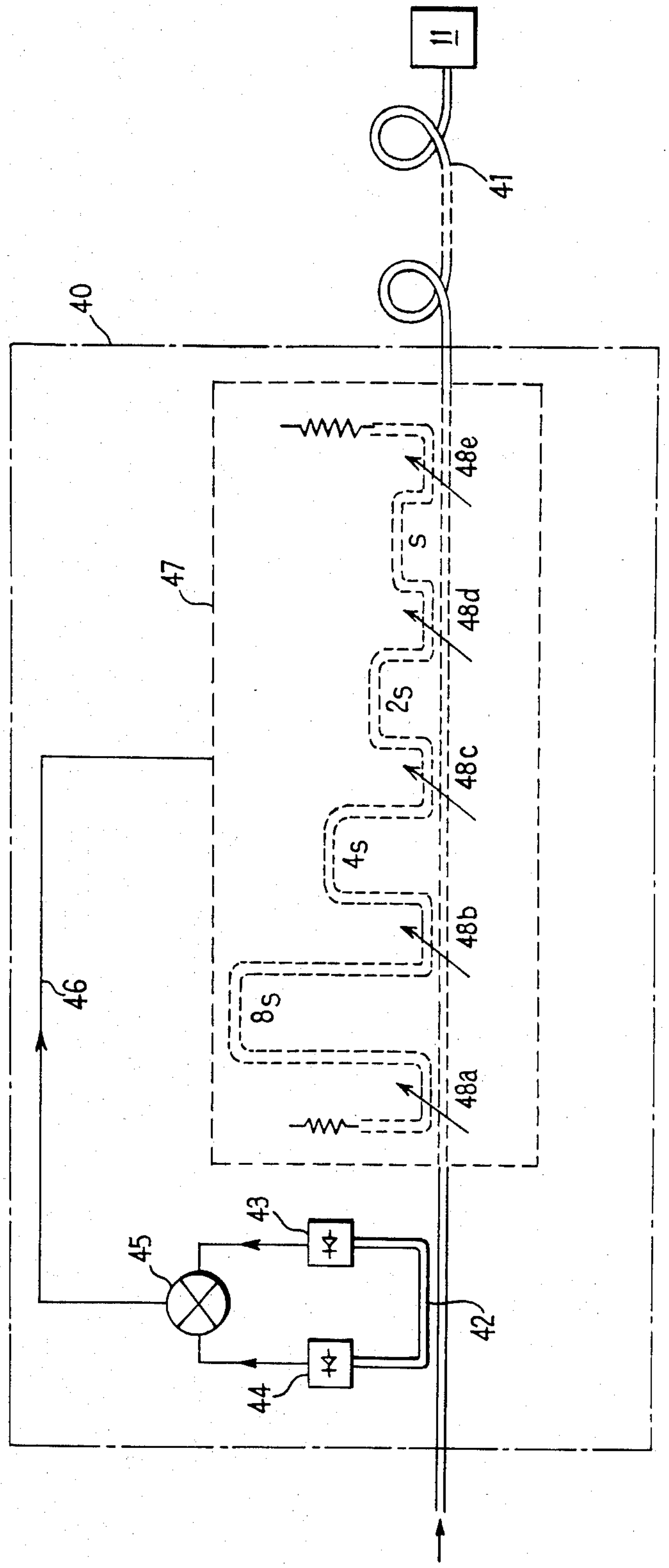
FIG. 4 is a diagrammatic view of a transmission link between the central processor and an antenna element of the system.

FIG. 4 is a schematic representation of the optical link 12 between the central processor 10 and one of the antenna elements. the first part of this link is constructed in an integrated optics subsystem 40 which may be formed integrally with part of the central processor, while the remainder of the link is provided by a length 41 of a single mode optical fiber. The integrated optics subsystem has a directional coupler 42 with one port connected to receive light from the central processor, another port connected to the optical fiber 41 and the remaining ports connected to photodiodes 43 and 44. Diode 44 receives a portion of the light transmitted from the central processor to the antenna element 11. The coupling of the fiber 41 to the antenna element is deliberately designed to produce a reflection, and may incorporate a partial reflector (not shown) at this point. The reflected signal returns to the integrated optics subsystem 40 where a portion of it is coupled to diode 44. The relative phases of the microwave frequency signal outputs from the two diodes 43 and 44 therefore depends upon the optical path length of the link. These signals are therefore fed to a phase sensitive detector 45 to provide a control signal on line 46 which is used either to regulate the optical path length of the optical link so as to maintain a substantially constant predetermined value for the microwave modulation frequency phase shift introduced by the link, or to compensate for this phase shift in the control of the phase of the modulation applied to the link by the central processor.

One way of maintaining a substantially constant optical path length for the link is to include in the optical path a switching network such as that illustrated at 47 by which additional lengths of optical waveguide can be electrically switched into the optical path. In the network shown schematically at 46 there are five four-port optical waveguide switches **48*a* to 48*e*, and four waveguide 'loops' introducing respectively additional optical path lengths of 8*s*, 4*s*, 2*s* and *s*. Switch 48*a* is controllable to direct light from the central processor either into the 8*s* loop or into its shunt. Switch 48*b* is controllable to direct light from the 8*s* loop or its shunt into the 4*s* loop or its shunt, and so on. Switches 48*a* and 48*e* may be realized by single electrically switched directional couplers. Greater flexibility is however required for switches 48*b*, 48*c* and 48*d***, which can be realized by tandem pairs of electrically switched directional couplers.

The alternative approach of using the signal on control line 46 to compensate elsewhere for the microwave modulation frequency phase shift introduced by the link between the central processor and the antenna element is simpler to implement when using the type of modulator described previously with reference to FIG. 2. In this instance the signal can be applied directly to the phase retarding element 28, or to a further phase retarding element (not shown) in tandem with element 28, because at this point a change in optical phase will produce an equivalent change in phase of the microwave frequency modulation. When using the type of modulator described previously with reference to FIG. 3 the control signal is applied to the microwave frequency phase shifter 300.

It will be noticed that the particular phase delay monitoring technique exemplified with reference to FIG. 4, being dependent upon a comparison between the phase of a launched signal and that of a reflected signal, actually measures the phase delay involved in a double transit of the link and thus leaves an unresolved ambiguity in the measure of the phase delay introduced by a single transit. (A single transit phase delay of x° will provide a double transit phase delay of 2x°, and the same double transit phase delay will also be provided by a single transit phase delay of (x+180)°.)

In practice however this need not be a problem if the system is chosen so that the links are all dimensioned to provide substantially the same phase delay in the first instance, and the design ensures that the maximum range of the environmentally induced excursions lies safely beneath the 180° ambiguity limit.

Figure 5:
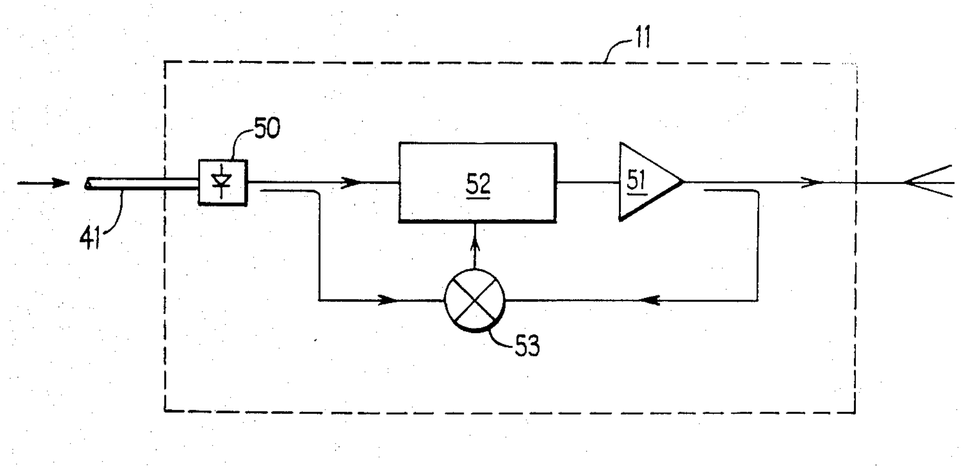

Turning attention now to the antenna element 11 whose structure is depicted in FIG. 5, the main consideration, assuming the correct microwaved phase has been delivered by the link to a photodetector 50, is to eliminate variations in phase through a power amplifier stage 51. This is achieved by inserting an electrically controlled microwave frequency phase shifter 52 between the output of the photodetector 50 and the input of the amplifier 51. Some of the signal output from the photodetector is tapped off and fed to a phase sensitive detector 53 where its phase is compared with that of power tapped from the output of the amplifier to produce the requisite control signal for controlling the phase shifter 52.

Figure 6:
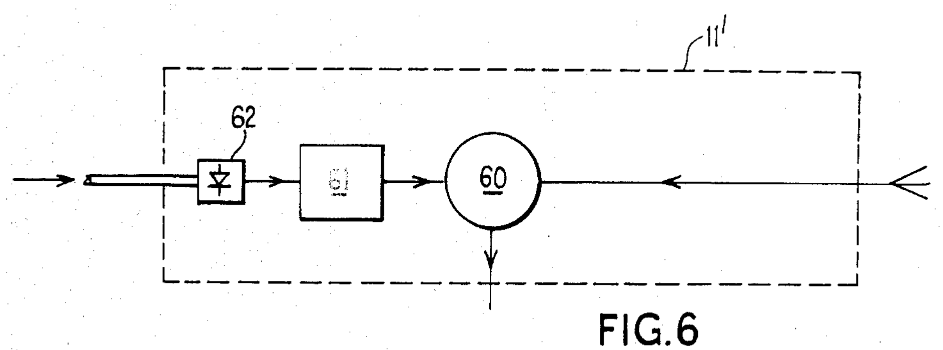
FIGS. 5 and 6 respectively are transmit type and receive type implementations of the antenna element of the system.

Although the foregoing specific description with reference to the drawings has referred exclusively to phased array radars of the transmission mode type, it will be clear that a receive mode type phased array radar requires substantially the same information to be fed to the antenna elements from the central processor as is required by the elements of the transmit type radar. Hence it will also be clear that the present invention is also applicable to receive type optically controlled phased array radars, though many of the components of the antenna elements will be entirely different in order to suit the quite different function of those elements. Typically in the antenna element 11' (FIG. 6) of a receive type radar the incoming radar signal will be fed to a mixer/frequency changer 60 where it is compared with a signal from an amplifier/oscillator 61 whose frequency and phase is controlled by the output of a photodiode 62. The amplifier/oscillator 61 may incorporate the same type of phase locked loop phase control as described previously with reference to the amplifier 51 of the antenna element of FIG. 5. The signal output of the mixer/frequency changer 60 may be at base band or at an intermediate frequency considerably lower in frequency than the microwave operational frequency of the radar and hence its transmission back to the central processor does not present the problems of the transmission of the microwave frequency control signals from the central processor to the antenna elements. Thus there is no need to impress it upon an optical carrier.

It will also be apparent that the invention is also applicable to an optically controlled phased array radar operable alternately in transmit and receive modes.

What is claimed is:

1. In an optically controlled phased array radar, the combination comprising: a plurality of sources of optical carriers; a plurality of antenna elements; a central processor; and a plurality of individual optical waveguide transmission links connecting said central processor to said antenna elements to transmit said optical carriers thereto, said central processor controlling the operation of said antenna elements by microwave signals impressed upon said optical carriers, each of said links including means for monitoring the microwave frequency phase shift introduced by that link to provide a compensation signal, said compensation signal being used to regulate the optical path length of that link.

2. A phase array radar as claimed in claim 1, wherein said phase shift monitoring means includes a four-port directional coupler inserted at said central processor end of each said transmission link, a first photodetector optically coupled with one port to detect a portion of the light launched into the link from the central processor end, a second photodetector optically coupled with another port to detect a portion of the light directed back through the link after reflection at the antenna end, and a phase sensitive detector connected to the outputs of said two photodetectors.

3. A phased array radar as claimed in claim 1, wherein for each link a single side band modulator is provided which impresses the microwave frequency signal on the optical carrier, and the output of the single side band modulator is mixed with a component of the carrier unmodulated by the microwave frequency signal, a phase retarding element, said component being transmitted through said phase retarding element controlled at least in part by the compensation signal.

4. A phased array radar as claimed in claim 1, which radar is operable in a transmit mode.

5. A phased array radar as claimed in claim 1, which radar is operable in a receive mode.

6. In an optically controlled phased array radar, the combination comprising: a plurality of sources of optical carriers; a plurality of antenna elements; a central processor; and a plurality of individual optical waveguide transmission links connecting said central processor to said antenna elements to transmit said optical carriers thereto, said central processor controlling the operation of said antenna elements by microwave signals impressed upon said optical carriers, each of said links including means for monitoring the microwave phase shift introduced by that link to provide a compensation signal, said compensation signal being used to offset the phase of the microwave frequency modulation of an optical signal applied to that link by said central processor.

7. A phased array radar as claimed in claim 6, wherein said phase shift monitoring means includes a four-port directional coupler inserted at said central processor end of each said transmission link, a first photodetector optically coupled with one port to detect a portion of the light launched into the link from the central processor end, a second photodetector optically coupled with another port to detect a portion of the light directed back through the link after reflection at the antenna end, and a phase sensitive detector connected to the outputs of said two photodetectors.

8. A phased array radar as claimed in claim 6, wherein for each link a single side band modulator is provided which impresses the microwave frequency signal on the optical carrier, and the output of the single side band modulator is mixed with a component of the carrier unmodulated by the microwave frequency signal; a phase retarding element, said component being transmitted through said phase retarding element controlled at least in part by the compensation signal.

9. A phased array radar as claimed in claim 6, which radar is operable in a transmit mode.

10. A phased array radar as claimed in claim 6, which radar is operable in a receive mode.

* * * * *